Sept. 19, 1950  R. H. GODDARD  2,523,010
AUXILIARY POWER TAKE-OFF FOR COMBUSTION CHAMBERS
Filed March 11, 1947
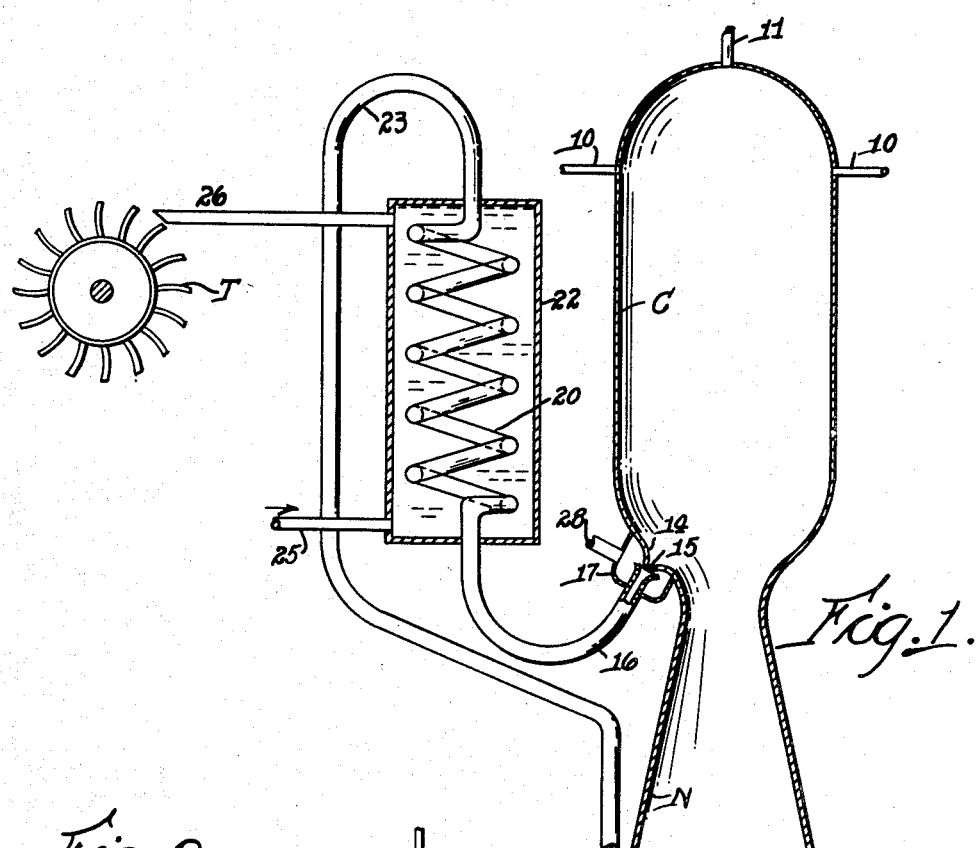
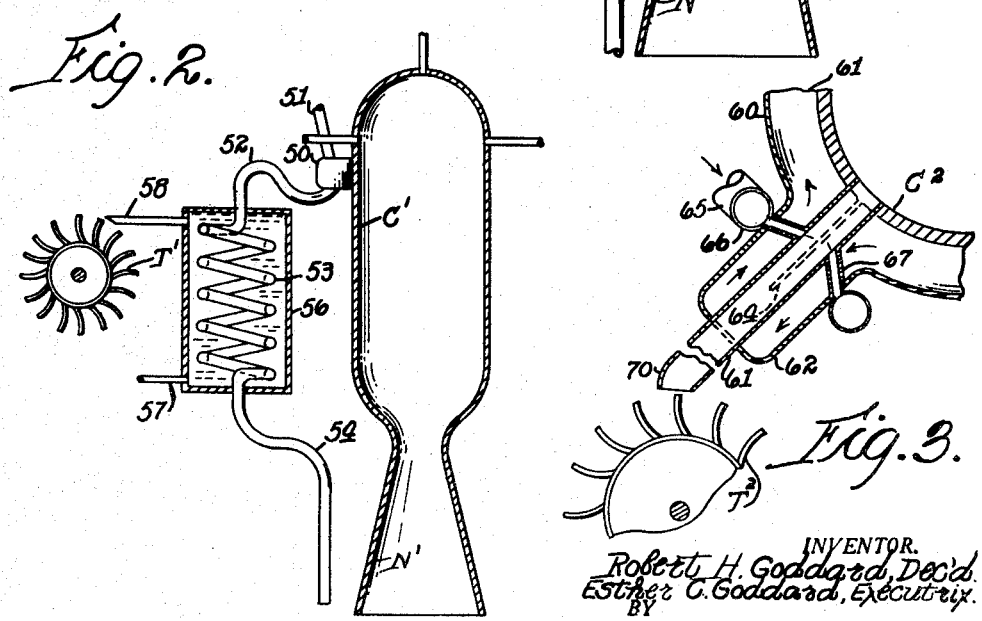
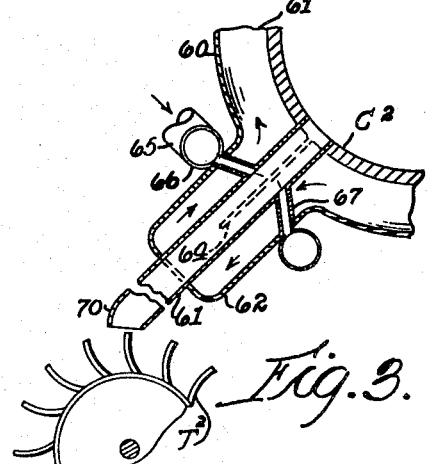
INVENTOR.
Robert H. Goddard, Dec'd.
Esther C. Goddard, Executrix.
BY
Chas. T. Hawley
ATTORNEY.

Patented Sept. 19, 1950

2,523,010

UNITED STATES PATENT OFFICE 2,523,010

AUXILIARY POWER TAKE-OFF FOR COMBUSTION CHAMBERS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application March 11, 1947, Serial No. 733,828

2 Claims. (Cl. 60—35.6)

This invention relates to combustion chambers such as are used in propulsion apparatus and which generate combustion gases under substantial pressure when in operation.

It is the general object of the present invention to provide improved auxiliary means for taking off power from such a combustion chamber by extracting a portion of the combustion gases and utilizing them to drive an auxiliary turbine or other power-developing mechanism.

A further object is to provide constructions in which the combustion gases act indirectly on the turbine or other power mechanism.

The invention further relates to arrangements and combinations of parts which will be hereinafter described and more particularly pointed out in the appended claims.

Three forms of the invention are shown in the drawing, in which:

Fig. 1 is a sectional side elevation of the invention, with the combustion gases extracted at the nozzle end of the combustion chamber;

Fig. 2 is a sectional side elevation of a modified construction in which the combustion gases are extracted near the closed or inner end of the combustion chamber; and Fig. 3 is a partial sectional elevation of a modified construction in which the combustion chamber is jacketed.

Referring to Fig. 1, a combustion chamber C of usual form is provided with a discharge nozzle N and receives gasoline and liquid oxygen through feed pipes 10 and 11 respectively.

Near the discharge end of the chamber C there is an outwardly displaced portion 14 having a port or opening 15. A pipe 16 is supported by a casing 17 in alignment with the opening 15, but with its outwardly flared intake end spaced from the chamber wall portion 14. The pipe 16 is connected to a coil 20 in a casing 22 which is filled with water and acts as a steam generator. At its upper end, the coil 22 is connected to a return pipe 23 through which the combustion gases are discharged closely adjacent the nozzle N.

Water enters the lower end of the casing or boiler 22 through a feed pipe 25, and the steam generated in the boiler is discharged through a pipe 26 adjacent a turbine T which is engaged and rotated thereby. The turbine T may drive auxiliary pumps to feed the combustion liquids to the pipes 10 and 11 or may be used for any desired power development.

Additional water is supplied through a pipe 28 to the casing 17 to cool the intake end of the pipe 16, where the very hot combustion gases are encountered. Some of the water in the casing 17 enters the narrow slot between the outwardly displaced portion 14 of the chamber wall and the flared intake end of the pipe 16. This water lowers the temperature of the combustion gases enough to prevent damage to the pipe 16.

Power is thus made available by indirect use of the combustion gases but these very hot gases are entirely confined until they have transferred a portion of their heat to the water in the boiler. They are then discharged adjacent the nozzle N where no harm can be done, even if the gases are still at fairly high temperatures.

The construction shown in Fig. 2 is quite similar to that shown in Fig. 1, except that the combustion gases are extracted from near the closed inner end of the combustion chamber C'. The gases are taken out through a casing 50 corresponding in function to the casing 17 and receiving cooling water through a pipe 51. The extracted combustion gases flow through a pipe 52 and coil 53 to a pipe 54 from which they are discharged adjacent the discharge nozzle N', as in the form previously described. The coil 53 is enclosed in a casing or boiler 56 which is supplied with water through a pipe 57 and which discharges steam through a pipe 58 to turn a turbine T'.

The operation and advantages are substantially the same as in the construction shown in Fig. 1, except that reversal of travel of the combustion gases is avoided, and that the gases are taken from the inner end of the combustion chamber where they are usually at a somewhat lower temperature, as combustion at that point is incomplete.

In the construction shown in Fig. 3, a portion of a combustion chamber C2 is shown, which is provided with a casing 60 enclosing a jacket space 61 which receives a liquid which cools the wall of the chamber C2. The gas take-off pipe 61 extends through the wall of the chamber C2, and a portion of the combustion gases are extracted directly therefrom.

A portion of the take-off pipe 61 adjacent the chamber C2 may be provided with a jacket 62 forming an extension of the jacket casing 60 and provided with diametrical spaced longitudinal partitions 64 which cause the cooling liquid to circulate as indicated by the arrows and to thus effectively cool the intake portion of the pipe 61 which is exposed to very high temperature.

Water may also be supplied through a pipe 65 to a ring 66 connected by small tubes 67 to the interior of the pipe 61. Cooling water may thus be injected into the stream of hot combustion gases, thus substantially reducing their temperature and increasing the volume by direct development of steam. The mixture of combustion gases and steam may be discharged directly through a nozzle 70 to rotate a turbine T2, or the mixture may be delivered to a heating coil as in the constructions shown in Figs. 1 and 2.

All three forms of the invention disclose simple and convenient means for taking-off gases from a combustion chamber to operate a turbine for fuel feed or for any other desired purpose.

Having thus described the invention and the advantages thereof, it will be understood that the invention is not to be limited to the details herein disclosed, otherwise than as set forth in the claims, but what is claimed is:

1. In combustion apparatus having a combustion chamber with a closed end and a discharge nozzle at the other end, in combination, said combustion chamber, means to take off hot combustion gases from said chamber near the entrance end of the chamber discharge nozzle, an auxiliary container in which a liquid is changed to vapor under pressure by the action of said hot gases in said container, said gases being delivered to and conducted through said container but out of direct contact with said liquid, and means to discharge said gases to the atmosphere near the outlet end of said nozzle and substantially axially thereof and in the same direction of travel as the gases adjacently discharged from said nozzle.

2. The combination in combustion apparatus as set forth in claim 1, in which the combustion gases are extracted from the combustion chamber through a take-off pipe, and in which means is provided to surround the intake end of said pipe with cooling liquid and to inject a portion of said cooling liquid into said extracted hot gases.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 916,726 | Lake | Mar. 30, 1909 |
| 1,452,249 | Miller | Apr. 17, 1923 |

FOREIGN PATENTS

| Number | Country | Date |
|---|---|---|
| 522,163 | France | Mar. 22, 1921 |
| 708,992 | France | May 11, 1931 |
| 374,663 | Italy | Sept. 4, 1939 |

OTHER REFERENCES

Astronautics, No. 34, June 1936, pages 9, 11 and 12.